US012716822B2

(12) United States Patent
Vlajic et al.

(10) Patent No.: US 12,716,822 B2
(45) Date of Patent: Aug. 25, 2026

(54) APPARATUS AND METHOD FOR MEASURING DYNAMIC TORQUE FOR DETERMINING FREQUENCY-DEPENDENT SHEAR IN VISCOELASTIC MATERIALS

(71) Applicant: The Penn State Research Foundation, University Park, PA (US)

(72) Inventors: Nicholas Vlajic, University Park, PA (US); Benjamin Beck, University Park, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 328 days.

(21) Appl. No.: 18/522,450

(22) Filed: Nov. 29, 2023

(65) Prior Publication Data

US 2024/0175794 A1 May 30, 2024

Related U.S. Application Data

(60) Provisional application No. 63/385,307, filed on Nov. 29, 2022.

(51) Int. Cl.
*G01N 3/26* (2006.01)
*G01N 3/24* (2006.01)

(52) U.S. Cl.
CPC ....... *G01N 3/26* (2013.01); *G01N 2203/0021* (2013.01); *G01N 2203/0025* (2013.01); (Continued)

(58) Field of Classification Search
CPC ...... G01N 33/442; G01N 11/105; G01N 3/22; G01N 15/0227; G01N 21/4788; G01N 11/167; G01N 3/38; G01N 3/00; G01N 11/14; G01N 3/18; G01N 11/16; G01N 33/4905; G01N 3/24; G01N 21/4795; (Continued)

(56) References Cited

U.S. PATENT DOCUMENTS

2014/0298918 A1* 10/2014 Kochmann .............. G01N 3/02 73/788
2021/0088797 A1* 3/2021 Uragami ................ B60K 35/53

OTHER PUBLICATIONS

F. M. Guillot and D. Trivett, "A dynamic Young's modulus measurement system for highly compliant polymers", The Journal of the Acoustical Society of America, vol. 114, No. 3, 2003.
I. Robinson and S. Schlamminger, "The watt or Kibble balance: a technique for implementing the new SI definition of the unit of mass", Metrologia, vol. 53, 2016.
J.-L. Wojtowicki, L. Jaouen and R. Panneton, "New approach for the measurement of damping properties of materials using the Oberst beam", Review of scientific instruments, vol. 75, No. 8, 2004, (2569-2574).
K. P. Menard and N. R. Menard, "Dynamic mechanical analysis", CRC Press, 2020.

(Continued)

*Primary Examiner* — Brandi N Hopkins
(74) *Attorney, Agent, or Firm* — BUCHANAN INGERSOLL & ROONEY PC

(57) ABSTRACT

An apparatus for determining the complex shear modulus of compliant viscoelastic specimens includes at least one magnet configured to provide a magnetic field; a specimen and a motor secured to the end of the specimen, wherein the motor is positioned proximate to the magnet such that the motor is in the magnetic field; a first coil fixed to the motor; an amplifier configured to provide a current in the first coil, such that the first coil interacts with the magnetic field and the current to apply a force to the specimen; a second coil fixed to the motor and configured to measure voltage; a mirror secured to the motor; a laser source focused on the mirror and configured to produce a laser, such that the mirror reflects the laser; and a photodetector configured to detect the laser reflected from the mirror.

8 Claims, 13 Drawing Sheets

(52) U.S. Cl.
CPC .................. *G01N 2203/005* (2013.01); *G01N 2203/0094* (2013.01); *G01N 2203/0222* (2013.01); *G01N 2203/0274* (2013.01); *G01N 2203/0641* (2013.01); *G01N 2203/0676* (2013.01); *G01N 2203/0682* (2013.01)

(58) Field of Classification Search
CPC ........ G01N 11/162; G01N 11/00; G01N 3/32; G01Q 10/065; G01Q 10/06; G01Q 10/04; G01Q 10/02; G01B 9/02; G01B 7/34; G01B 11/16; G01R 33/28; G01R 33/0327; E21B 49/008; G01J 3/4412; G01J 3/453; A61B 34/20; A61B 8/10; A61B 5/0059; A61B 3/102; A61B 3/10; A61B 8/4483; A61B 3/16; G01V 1/181; H04R 29/003; G02F 1/09; H02J 50/005; G02B 7/1821; B25J 9/1697; H01F 7/0278; G01D 11/00; G01L 1/125
See application file for complete search history.

(56) References Cited

OTHER PUBLICATIONS

N. Pemberton-Pigott, C. Watson and D. Haub, “Measuring elastic moduli and loss tangent using a free-free resonant bar method”, The Journal of the Acoustical Society of America, vol. 149, No. 2, 2021, (1058-1068).
A. Barone and A. Giacomini “Experiments on Some Electrodynamic Ultrasonic Vibrators”, Ultrasonic Electro-Acoustics, Acustica, vol. 4 (1954), p. Nos. 182-184.
David A. Brown and Steven L. Garrett, Department of Physics Code PH/Gx, Naval Postgraduate School, “Resonant Acoustic Determination of Complex Elastic Moduli”.
J.H. Sanders and A. H. Wapstra, “Atomic Masses and Fundamental Constants 5” Springer Science +Business Media, LLC, 1976.
D.Malogi, A. Gupta, and G. R. Kathawate, “Center Impedance Method for Damping Measurement”, Hindawi Publishing Corporation, Advances in Acoustics and Vibration, vol. 2009, Article ID 319538, 7 pages, doi:10.1155/2009/319538.
S. L. Garrett, “Resonant Acoustic Determination of Elastic Moduli”, Journal of the Acoustical Society of America, 88, 210-221 (1990).

* cited by examiner

APPARATUS AND METHOD FOR MEASURING DYNAMIC TORQUE FOR DETERMINING FREQUENCY-DEPENDENT SHEAR IN VISCOELASTIC MATERIALS

CROSS-REFERENCE TO RELATED APPLICATIONS

This patent application is related to and claims the benefit of priority of U.S. provisional application 63/385,307, filed on Nov. 29, 2022, the entire contents of which is incorporated by reference.

FIELD OF THE INVENTION

Embodiments relate to an apparatus for measuring dynamic material properties in viscoelastic materials and methods of making and using thereof.

BACKGROUND OF THE INVENTION

Measuring the dynamic material properties of compliant viscoelastic materials has many applications. The most commonly used property—and widely accepted as the simplest model—is a complex shear moduli of the form $G^*=G_r+iG_i$, where $G_r$ is the storage modulus (elastic portion) and $G_i$ is the loss modulus (energy dissipation portion). However, the complex shear modulus is notoriously difficult to measure. While there have been a number of experiments developed to measure Young's modulus (e.g., center point impedance method (Malogi, D.; Gupta, A.; Kathawate, G. Center impedance method for damping measurement. *Advances in Acoustics and Vibration.* 2009), vibrating Oberst bar (Wojtowicki, J. L.; Jaouen, L.; Panneton, R. New approach for the measurement of damping properties of materials using the oberst beam. *Review of Scientific Instruments, vol.* 75, no. 8. 2004), and dynamic Young's modulus analyzer (Guillot, F. M.; Trivett, M. A dynamic young's modulus measurement system for highly compliant polymers. *Journal of Acoustical Society of America, vol.* 114, no. 3. 2003)), direct measurements of dynamic shear properties still remain a challenge.

Pemberton-Piggot et al. (Pemberton-Piggot, N.; Watson, C.; Haub, D. Measuring elastic moduli and loss tangent using a free-free resonant bar method, *Journal of Acoustical Society of America*, vol. 149, no. 2. 2021) and Menard et al. (Menard, K. P.; Menard, N. R. Dynamic mechanical analysis. CRC Press. 2020) provide a summary of the current state-of-the-art techniques used to measure dynamic shear properties. The primary direct measurements of shear include sandwich shear plates techniques, torsion rheometers, and torsional oscillations of rods. Shear plates and torsion rheometers have drawbacks in that they can only be used over a limited a frequency range on the order of tens to hundreds of Hertz and are sensitive to boundary conditions. Moreover, measuring properties for materials with high loss-factors becomes even more challenging as the shear modulus and loss-factor change with frequency and temperature.

Determining viscoelastic material properties from the torsional vibrations of rods was initially proposed by Barone et al. (Barone, A.; Giacomini, A. Experiments on some electrodynamic ultrasonic vibrators. *Acta Acustica united with Acustica*, vol. 4, no. 1. 1954). A modernized version of the experiment was produced by Garrett (Garrett, S. L. Resonant acoustic determination of elastic moduli. *Journal of Acoustical Society of America*, vol. 88, no. 1. 1990) and Brown et al. (Brown, D. A.; Garrett, S. L. Resonant acoustic determination of complex elastic moduli. NASA, Washington Technology: *The second national technology transfer conference and exposition.* 2001), and more recently by Pemberton-Piggot et al. However, Garrett did not consider the loss factor and only considered the elastic portion of the response. Notably though, Brown et al. observed that the velocity through the coil is proportional to a constant, and if this proportionality constant can be measured, then applied torque acting on the material can then be determined.

BRIEF SUMMARY OF THE INVENTION

Embodiments relate to an apparatus and method of measuring the shear modulus of compliant viscoelastic materials by applying a known dynamic torque using Kibble's method (formerly referred to as the watt balance method; see Kibble, B. A measurement of the gyromagnetic ratio of the proton by the strong field method. *Atomic Masses and Fundamental Constants* 5, 1976; see also Robinson, J.; Schlamminger, S. The watt or Kibble balance: a technique for implementing the new SI definition of the unit of mass. *Metrologia*, vol. 53, no. 5. 2016) and by measuring the proportionality constant mentioned in the work of Brown et al. In particular, Kibble's method, which utilizes a velocity measurement and two electrical measurements, is used to calculate applied torque and response of a viscoelastic specimen as a function of frequency, and this information can be used to determine shear modulus and loss factor by fitting mechanical models to transfer functions between the applied torque and torsional response of the sample. While previously published shear measurement techniques rely on resonant methods, present embodiments are able to fit the data over a large frequency range, namely, more than the sixth torsional resonant frequency of the system.

In an exemplary embodiment, an apparatus for measuring dynamic torque to determine frequency-dependent shear comprises at least one magnet configured to provide a magnetic field; a viscoelastic specimen comprising a first end and a second end, wherein the first end is fixed to a structure; a motor secured to the second end of the specimen, wherein the motor is positioned proximate to the at least one magnet such that the motor is in the magnetic field; a first coil fixed to the motor; an amplifier configured to provide a current in the first coil, such that the first coil interacts with the magnetic field and the current to apply a force to the specimen; a second coil fixed to the motor and configured to measure voltage; a mirror secured to the motor; a laser source focused on the mirror and configured to produce a laser, such that the mirror reflects the laser; and a photodetector configured to detect the laser reflected from the mirror.

In some embodiments, the first coil and the second coil are a twisted bifilar pair.

In some embodiments, the viscoelastic specimen comprises a viscoelastic material selected from the group consisting of polymers, urethanes, rubbers, and mixtures thereof.

In some embodiments, the viscoelastic specimen is rod-shaped.

In some embodiments, an aspect ratio of the specimen is at least 10.

In some embodiments, the apparatus further comprises a magnetic field guide positioned proximate to the at least one magnet and configured to provide a shape of the magnetic field.

In some embodiments, the specimen is in a temperature control chamber.

In some embodiments, the apparatus is in a temperature control chamber.

In some embodiments, the apparatus further comprises a resistor configured to measure the current.

In some embodiments, the apparatus further comprises a digitizer configured to measure the voltage.

In an exemplary embodiment, a method of measuring dynamic torque to determine frequency-dependent shear comprises providing an apparatus, the apparatus comprising: at least one magnet, a viscoelastic specimen comprising a first end and a second end, wherein the first end is fixed to a structure, a motor secured to the second end of the specimen, a first coil and a second coil fixed to the motor, a mirror secured to the motor, a laser source, and a photodetector; providing a magnetic field via the magnet; positioning the motor proximate to the at least one magnet such that the motor is in the magnetic field; providing a current in the first coil via an amplifier, such that the first coil interacts with the magnetic field and the current to apply a force to the specimen; focusing the laser source on the mirror; providing a laser via the laser source, such that the mirror reflects the laser; and detecting the laser reflect from the mirror.

In some embodiments, the mirror is positioned at a distance from the photodetector, and wherein a position of the laser detected by the photodetector changes as force is applied to the specimen.

In some embodiments, the method further comprises calculating angular position using the formula $$\theta = \operatorname{asin}\left(\frac{\delta}{L_0}\right),$$

wherein δ is the change in position of the laser detected by the photodetector 134 and $L_0$ is the distance between the mirror and the photodetector.

In some embodiments, the method further comprises calculating the angular velocity the formula $$\dot{\theta} = \frac{d\theta}{dt}$$

or the formula $\dot{\theta}=i\omega\theta$.

In some embodiments, the viscoelastic specimen comprises a viscoelastic material selected from the group consisting of polymers, urethanes, rubbers, and mixtures thereof.

In some embodiments, the viscoelastic specimen is rod-shaped.

In some embodiments, the aspect ratio of the specimen is at least 10.

In some embodiments, the method further comprises placing the specimen in a temperature control chamber.

In some embodiments, the method further comprises placing the apparatus in a temperature control chamber.

In some embodiments, the method further comprises measuring a current in the first coil using a resistor.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages, and possible applications of the present invention will be more apparent from the following more particular description thereof, presented in conjunction with the following drawings. It should be understood that like reference numbers used in the drawings may identify like components.

DETAILED DESCRIPTION OF THE INVENTION

Figure 1:
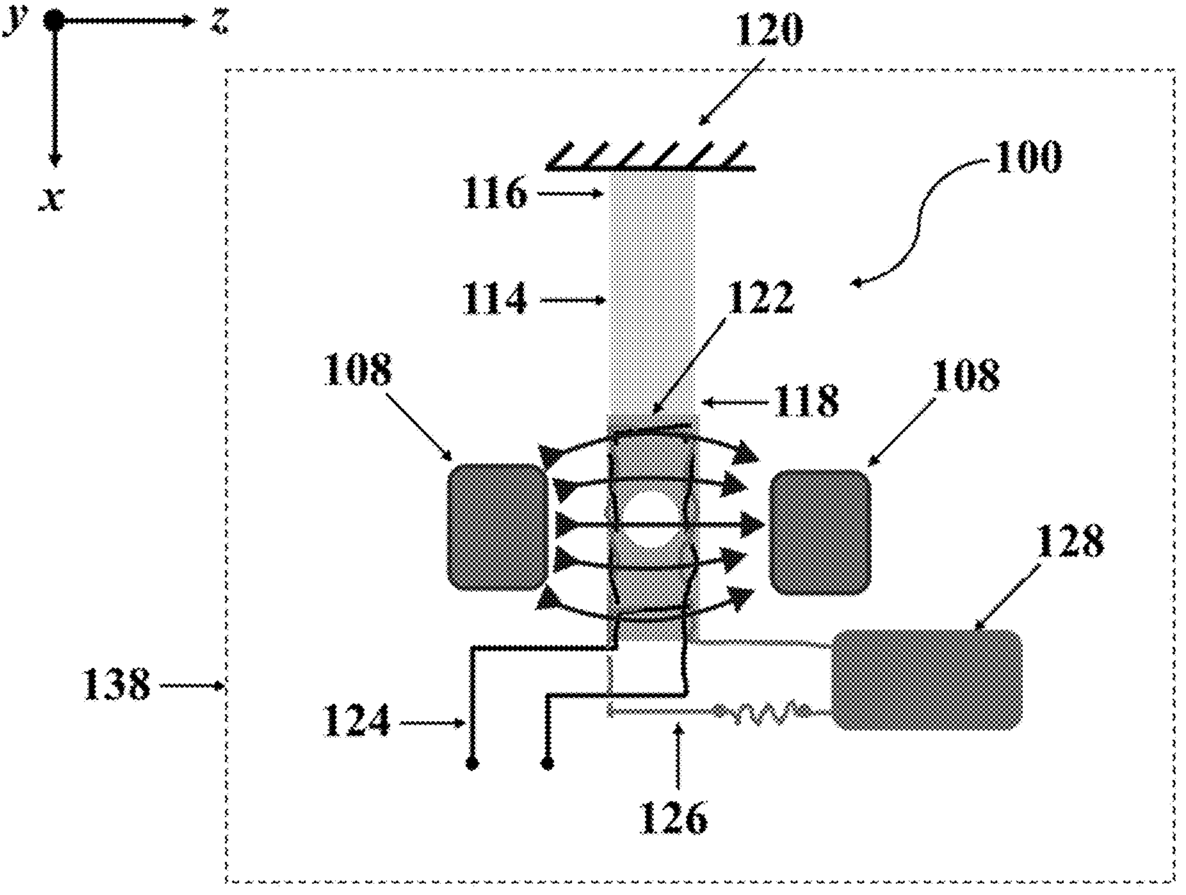
FIG. 1 shows a schematic front view of an exemplary apparatus.
Figure 2:
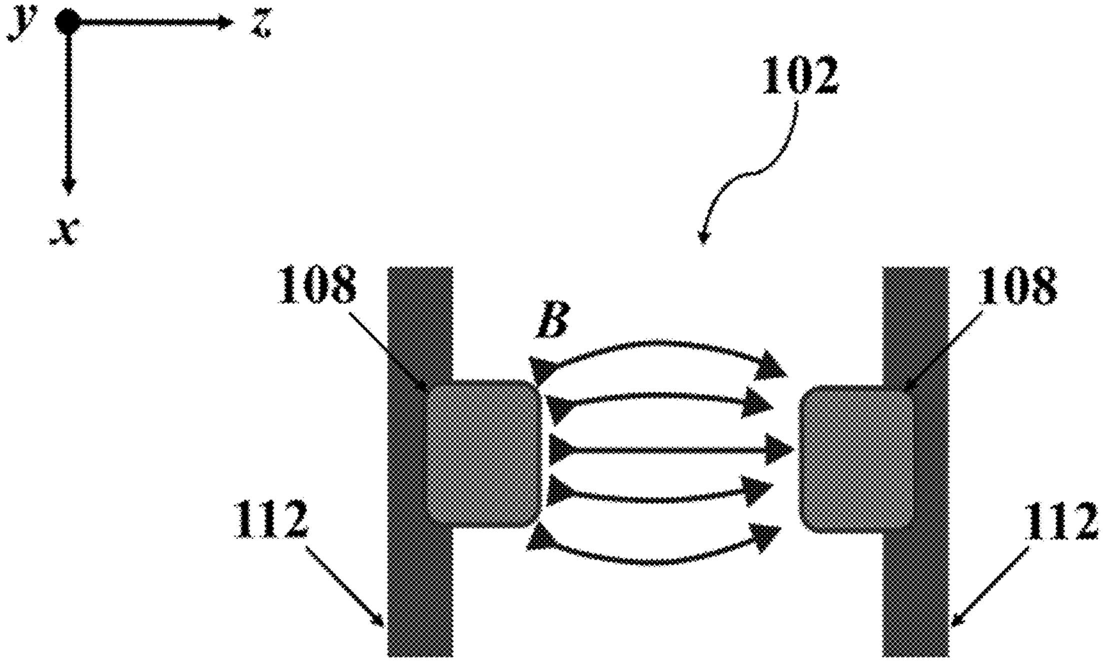
FIG. 2 shows a schematic front view of an exemplary magnetic field assembly.
Figure 3:
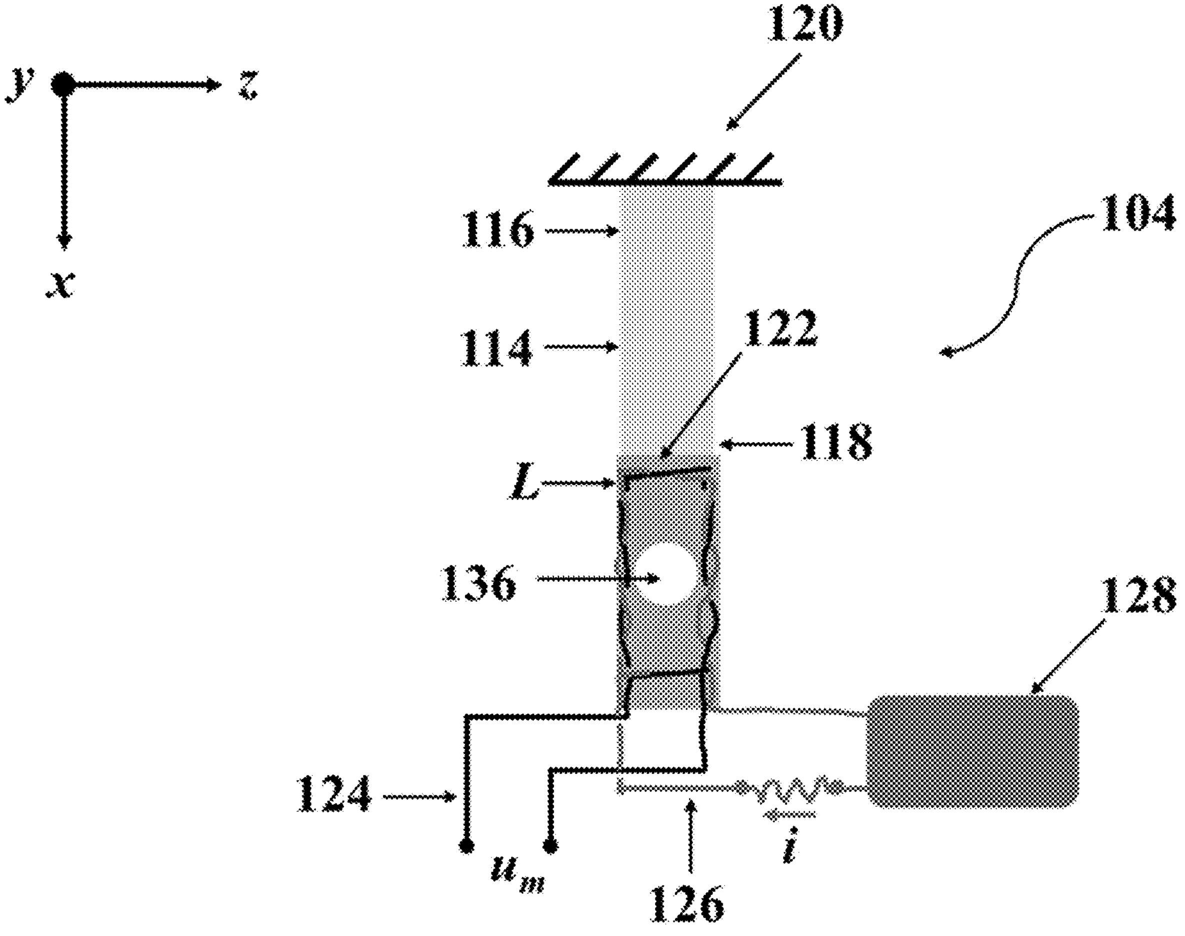
FIG. 3 shows a schematic front view of an exemplary specimen assembly.

The following description is of an embodiment presently contemplated for carrying out the present invention. This description is not to be taken in a limiting sense but is made merely for the purpose of describing the general principles and features of the present invention. The scope of the present invention should be determined with reference to the claims.

Embodiments relate to an apparatus and method of determining the complex shear modulus of compliant viscoelastic specimens. In particular, embodiments relate to an apparatus and method of measuring angular velocity and dynamic torque, which can then be used to determine frequency-dependent shear in viscoelastic specimens.

In accordance with this disclosure, FIGS. 1-4 show an exemplary apparatus 100 comprising a magnetic field assembly 102, a specimen assembly 104, and a laser assembly 106.

The magnetic field assembly 102 comprises at least one magnet 108 configured to provide a magnetic field B. A magnetic field B may be defined as an area in which the non-contact force of magnetism has an effect on other magnets or magnetic materials. In a preferred embodiment, the magnetic field B is as large as possible such that a minimum amount of current i is supplied to a motor 122. In an exemplary embodiment, the magnetic field at the surface of the at least one magnet 108 may be approximately 6600 Gauss (0.66 Tesla). It is contemplated that the at least one magnet 108 is a rare earth permanent magnet, such as a rare earth neodymium grade N52 magnet.

In an exemplary embodiment, a magnet 108 may be a permanent magnet comprising a first pole located some distance away from a second pole, wherein the first and second poles are oppositely charged and produce a magnetic field B. It is contemplated that the area between the first pole and a second pole may define the magnetic field B. In an alternative embodiment, a first magnet 108 may be a permanent magnet comprising a first pole and a second magnet 108 may be a permanent magnet comprising a second pole, wherein the first pole and second pole are located some distance away from one another such that the first and second poles are oppositely charged and produce a magnetic field B.

The magnetic field assembly 102 may further comprise a magnetic field guide 112 disposed proximate to the at least one magnet 108 and configured to provide a selected shape of the magnetic field B. The magnetic field guide 112 may comprise a high permeability material, for example, any ferrous material, such as iron or alloys thereof. It is contemplated that the magnetic field guide 112 may further mechanically reinforce and support the at least one magnet 108 such that the at least one magnet 108 remains stationary during operation.

The specimen assembly 104 comprises a specimen 114. The specimen 114 may be any three-dimensional member made of a viscoelastic material, including but not limited to polymers, urethanes, rubbers, plastics, and mixtures thereof. A viscoelastic material may be defined as a material exhibiting both elastic and viscous behavior when deformed. It is contemplated that the apparatus 100 can further accommodate any non-conductive specimen 114, including but not limited to wood, solid foods (e.g., cheese), etc. It is contemplated that the specimen 114 may be rod-like (e.g., cylindrically shaped) and has a circular or substantially circular cross-section. It is further contemplated that the specimen 114 may have an aspect ratio of at least 10, such that a length at least 10 times greater than its diameter so that the specimen's response follows the mechanics of a rod in torsion. For example, it is recommended that the specimen 114 has a length between 5 cm and 50 cm, and a diameter between 0.5 cm and 5 cm.

The specimen 114 has a first end 116 and a second end 118. The first end 116 is secured to a structure 120 such that the position of the first end 116 is fixed. The structure 120 may be any structure sufficient to fix the position of the first end 116 relative to the second end 118, such as a post, rod, plate, or any other sufficient structure. The first end 116 may be secured to the structure 120 using any sufficient securing means, including but not limited to an adhesive, a mechanical fastener, or combinations thereof.

Figure 4:
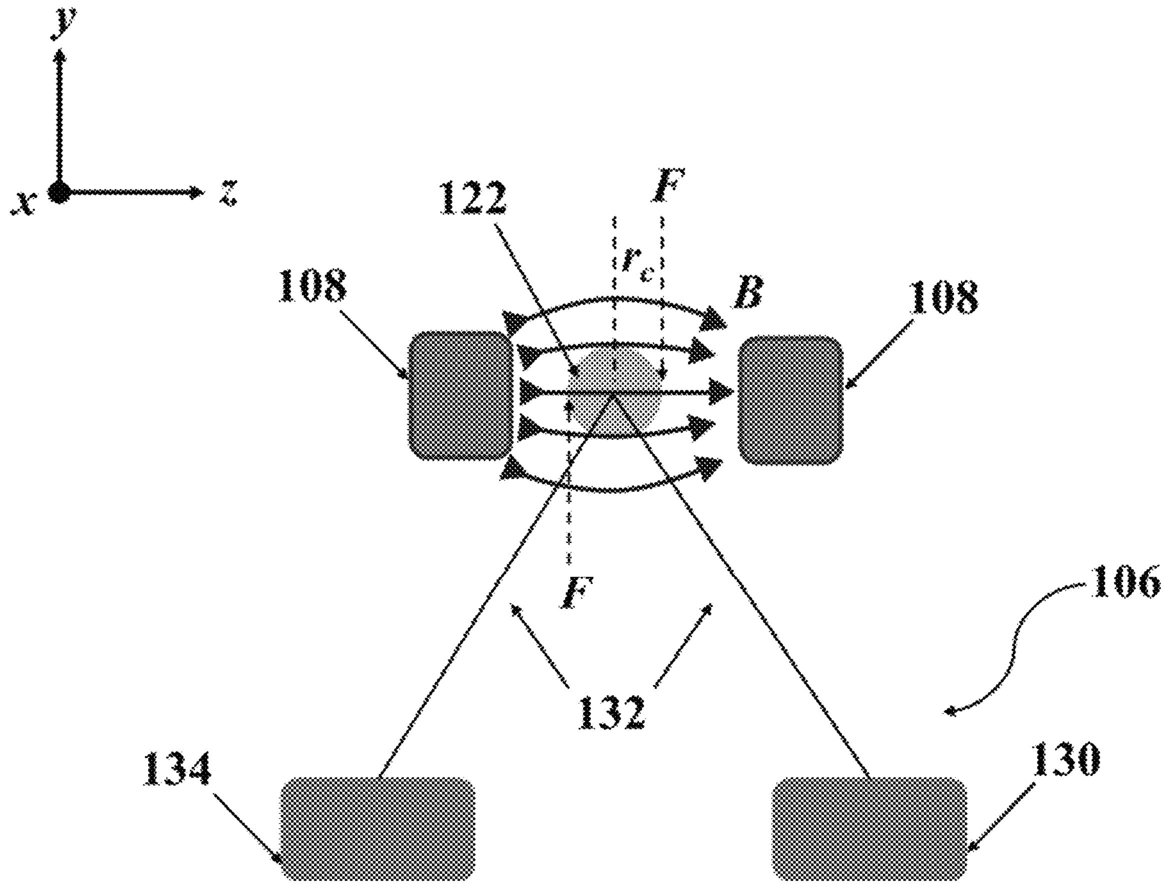
FIG. 4 shows a schematic top view of exemplary magnetic field and laser assemblies.
Figure 5:
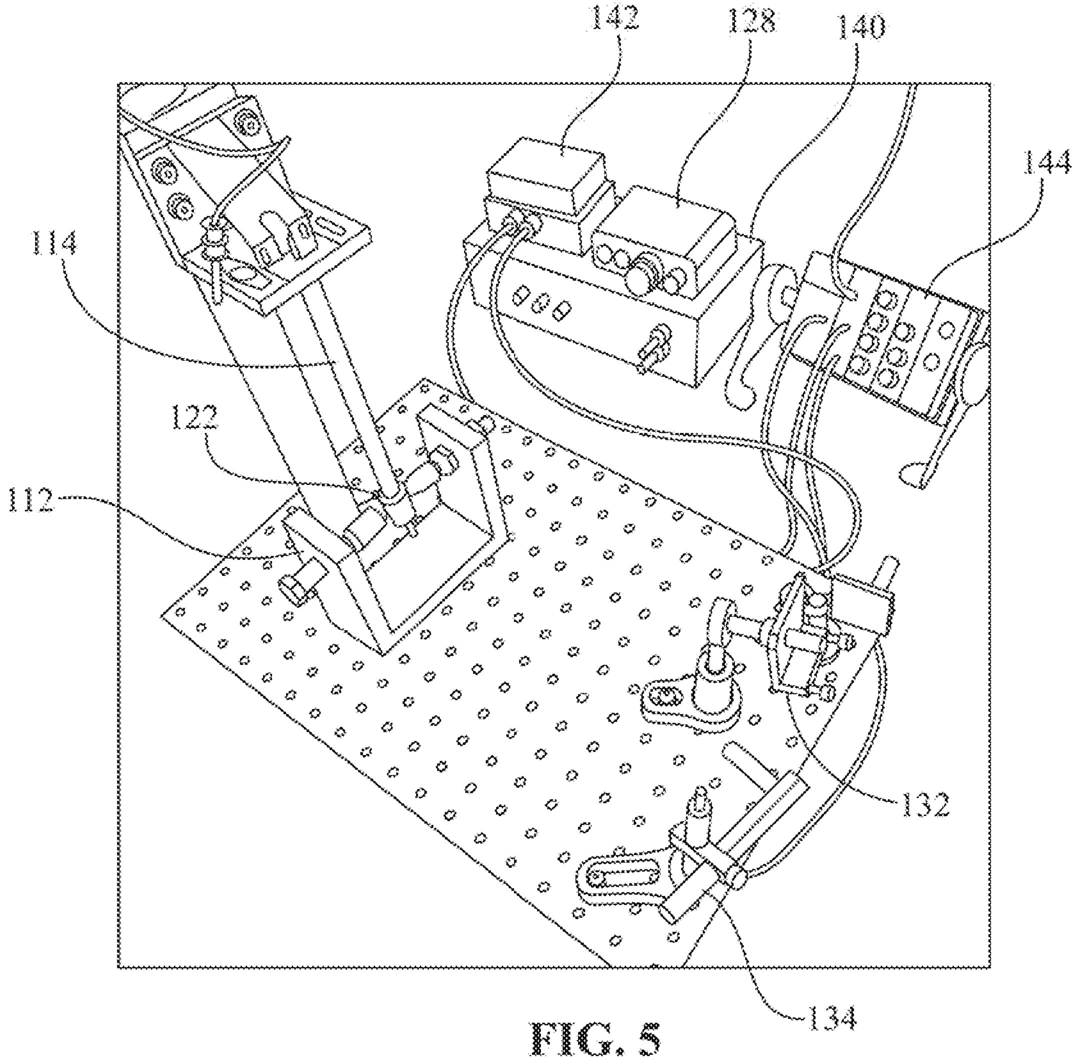
FIG. 5 shows a schematic of an exemplary apparatus.

The specimen assembly 104 further comprises a motor 122 secured to the second end 118 of the specimen 114. It is contemplated that the specimen assembly 104 is positioned relative to the magnetic field assembly 102 such that the motor 122 is disposed proximate to the at least one magnet 108 in the magnetic field B. The motor 122 advantageously comprises an electrically insulated material. If, for example, the motor 122 comprises an electrically conducting material (e.g., metal), Eddy currents may be generated in the motor 122 and corrupt resulting signals/measurements. A first coil 124 and a second coil 126 may be fixed on the motor 122 such that the first coil 124 and second coil 126 may be similarly disposed in the magnetic field B. In an exemplary embodiment, the first coil 124 and second coil are wound around the motor 122, preferably in a loop extending primarily in the x-direction (see FIGS. 1 and 3). It is contemplated that the distance from the center of the motor 122 to the mean coil position may be defined as $r_c$, and the effective coil length perpendicular to the magnetic field may be defined as L, as seen in FIG. 4.

The first coil 124 may be a drive coil configured to interact with the magnetic field B and apply a force (e.g., torsion force) F to the specimen 114. In an exemplary embodiment, an alternating current i in the first coil 124 provided by an amplifier 128, in combination with the magnetic field B provided by the at least one magnet 108, provides a force F to the specimen 114. The second coil 126 may be a sensing coil configured to measure and monitor the voltage $u_m$, which is generated from the oscillating motor in the magnetic field. There will also be a portion of $u_m$ that originates from the alternating current i in the first coil 124.

In an embodiment, the first coil 124 and second coil 126 may be a twisted bifilar pair. It is contemplated that this configuration is advantageous and allows for torque to be measured more accurately since both wires experience the same $2r_cBL$ product. In such embodiment, it is contemplated that the mean coil position $r_c$ is the position of both the first coil 124 and second coil 126 and the effective coil length L is the length of both the first coil 124 and second coil 126, as the coils are twisted together in a pair such that both coils experience the same effective length and magnetic flux density.

It is contemplated that the apparatus 100 may be used to make a dynamic measurement rather than a static measurement. Moreover, the bifilar arrangement of the first coil 124 and second coil 126 is used to make a simultaneous measurement of the current i and induced voltage $u_m$ through the coil. On the other hand, previously reported studies operated their respective devices in two separate modes. Specifically, current was measured in the "weighing mode" and voltage was measured in the "calibration" mode.

The laser assembly 106 includes a laser source 130 configured to provide a laser 132, and a photodetector 134 configured to detect (e.g., indirectly or directly) the laser 132. The laser source 130 may be focused on a mirror 136 secured to the motor 122 such that the mirror 136 reflects the laser 132 from the laser source 130 to the photodetector 134. The mirror 136 may be any surface capable of reflecting the laser 132. In operation, as the first coil 124 applies force to the specimen 114 and the specimen 114 twists, the location of the reflected laser 132 detected by the photodetector 134 changes. The angular velocity can be calculated by considering the distance that the reflected laser 132 moves on the photodetector 134 and the distance between the mirror 136 and the photodetector 134. In particular, angular velocity may be measured using the formula $$\theta = \operatorname{asin}\left(\frac{\delta}{L_0}\right),$$

where δ is the distance that the reflected laser 132 moves on the photodetector 134 and $L_0$ is the distance between the mirror 136 and the photodetector 134.

The mirror 136 may be located at a first distance from the laser source 130 and at a second distance from the photodetector 134, such that the first and second distances are the same or substantially the same. In alternative embodiment, the first and second distances are different or substantially different.

It is contemplated that photodetector electronics 142 may be in communication with the photodetector 134 to provide a +/−5 V differential to power the photodetector 134. The X, Y, and Sum voltage signals from the photodetector 134 are also split into signals that can be recorded with the electronics 142.

In an exemplary embodiment, all or part of the apparatus 100 (e.g., magnetic field assembly 102 and/or specimen assembly 104 and/or laser assembly 106) may be positioned in a temperature control chamber 138 such that the specimen 114 may be tested at different temperatures. The temperature control chamber 138 may comprise a heating source configured to raise the temperature at which the specimen 114 is tested. The temperature control chamber 138 may also comprise a cooling source configured to lower the temperature at which the specimen 114 is tested.

A shunt resistor 140 may be arranged in parallel and in communication with the amplifier 128 to measure and monitor the alternating current i in the first coil 124.

A digitizer (not shown) may be configured to measure and monitor the voltage $u_m$ through the coil.

It is contemplated that data may be collected and stored using data acquisition module 144. In an exemplary embodiment, the specimen 114 may be excited in torsion by generating a pseudo-random white noise signal with a signal generator or with software. The voltage signal is fed into the amplifier 128. It is noted that slowly swept sine waves can also be used to drive the system, rather than the pseudo-random white noise. Exemplary signals may include the voltage across the precision resistor (which is used to calculate current i), response voltage from the coil, and the voltage from the photodetector 136 that is used to calculate position. When driving with white noise, the cross-power spectral densities of all the signals are recorded. The transfer function may be calculated using Equation (16) below.

It is contemplated that various components of the apparatus 100 can be made from a metal, plastic, glass, ceramic, polymer, composite, and the like or a combination thereof. Materials of construction selected for various components should not interfere with operability of the apparatus 100.

In an embodiment, a method of measuring angular velocity and dynamic torque using the apparatus 100 includes providing at least one magnet 108 configured to provide a magnetic field B; providing a specimen 114 comprising a first end 116 and a second end 118, wherein the first end 116 is fixed to a structure 120 and the second end 118 is provided with a motor 122; and disposing the motor 122 proximate to the at least one magnet 108 and in the magnetic field B such that a first coil 124 fixed to the motor 122 may interact with the magnetic field B and apply a force to the specimen 114. In an exemplary embodiment, an alternating current i in the first coil 124 provided by an amplifier 128, in combination with the magnetic field B provided by the at least one magnet 108, provides a force F to the specimen 114. A second coil 126 may further be fixed to the motor 122 and configured to measure and monitor the voltage $u_m$ from the alternating current i in the first coil 124. The process for making the apparatus further includes providing a laser source 130 configured to provide a laser 132 and a photodetector 134 configured to detect (directly or indirectly) the laser 132; and focusing the laser source 130 on a mirror 136 secured to the center of the motor 122 such that the mirror 136 reflects the laser 132 from the laser source 130 to the photodetector 134. As the first coil 124 applies force F to the specimen 114 and the specimen 114 twists, the location of the reflected laser 132 detected by the photodetector 134 changes. The angular velocity may then be calculated by using the distance between the mirror 136 and the photodetector 134.

The process of using the apparatus 100 may further include positioning at least the specimen 114 in a temperature control chamber 138 such that the specimen 114 may be tested at different temperatures.

To determine frequency-dependent shear in the specimen 114, derivation of the analytic transfer function for a rod in torsion is required. Experimental data may then be fit to the transfer function to identify the frequency dependent shear. The governing linear partial differential equation of motion for a rod-like specimen with a circular cross-section undergoing torsion is given to be:

$$\rho J \frac{\partial^2 \theta}{\partial t^2} - G^* J \frac{\partial^2 \theta}{\partial x^2} = \tau_d \tag{1}$$

where ρ is the density of the specimen 114 per unit length, J is the polar moment of inertia of the specimen 114, and $\tau_d$ is an applied distributed torque per unit length. Here, $G^*=G_r+iG_i$ is the complex shear modulus where $G_r$ is the real portion and $G_i$ is the imaginary portion that accounts for loss or dispersive effects. An alternative, but equivalent form, G* is:

$$G^*=G[\cos\delta+i\sin\delta] \tag{2}$$

where $i=\sqrt{-1}$ and δ is the loss factor.

An objective of present embodiments is to identify $G_r$ and $G_i$, or equivalently, identify G and δ. If there is no distributed torque, Equation (1) can be rearranged as:

$$\frac{\partial^2 \theta}{\partial t^2} - c^{*2} \frac{\partial^2 \theta}{\partial x^2} = 0 \tag{3}$$

where $c^*=\sqrt{G^*/\rho}$ is the shear wave-speed of the specimen 114. The boundary conditions for the specimen 114 fixed to a structure 120 at its first end 116 with a lumped mass of mass polar moment of inertia $I_m$ are given to be:

$$at\colon x=0\colon \theta(0,t)=0 \tag{4}$$

$$at\colon x=l\colon G^* J \frac{\partial \theta}{\partial x} + I_m \frac{\partial^2 \theta}{\partial t^2} = \tau \tag{5}$$

The torque applied to the specimen 114 will be harmonic such that the torque can be written:

$$\tau=T(\omega)e^{i\omega t} \tag{6}$$

where ω is the frequency in radians per second. Assuming the specimen 114 behaves as linear and time-invariant system, the response can be decomposed using separation of variables as:

$$\theta(x,t)=\psi(x)\chi(\omega)e^{i\omega t} \tag{7}$$

Solving the homogenous eigenvalue problem gives the assumed displacement at x=l:

$$\psi(l)=\sin(k^* l) \tag{8}$$

where $k^*=\omega/c^*$ is the complex wave number. Substituting Equation (8) into Equation (5) yields the closed form solution for the response of the rod at a given frequency:

$$\frac{\theta(l)}{\tau} = \frac{\sin k^* l}{k^* G^* J \cos k^* l - I_m \omega^2 \sin k^* l} \tag{9}$$

In Equation (9), the following parameters are known: the length of the specimen l, the density of the specimen ρ (which is embedded in k*), the moment of inertia of the specimen J, and the frequency of excitation ω. The applied torque $\tau$ is measured using Kibble's technique, as described below. The parameters G and $\delta$ (similarly $G_r$ and $G_i$) are determined by fitting Equation (9) to measured data. The polar moment of inertia of the motor 122 on the end $I_m$ can either be measured and inserted into Equation (9), or it may be a parameter that is fit to the data.

It is noted that in the derivation, it is assumed that G* was constant with respect to frequency. However, over large frequency ranges (on the order of several hundred Hz), the shear modulus may take on other form factors, for example, polynomials of the form:

$$G^*=(G_{r,0}+\omega G_{r,1})+i(G_{i,0}+\omega G_{i,1}) \tag{10}$$

The governing equations that are used to measure the applied torque $\tau$ on the specimen 114 using Kibble's technique are provided by Lorentz Law and Maxwell's Law:

$$\tau = 2r_c F = 2r_c BLi \tag{11}$$

$$u_m = 2BLv_m + \kappa\frac{di}{dt} \tag{12a}$$

$$u_m = 2BLr_c\dot{\theta} + \kappa\frac{di}{dt} \tag{12b}$$

where $v_m=r_c\dot{\theta}$. Equation (11) represents the first coil 124, while Equations (12a) and (12b) represent the second coil 126. In Equation (11), $\tau$ [Nm] is the applied torque, F [N] is the applied force, $r_c$ [m] is the distance from the center of the motor 122 to the mean coil position, B [T] is the magnetic field, L [m] is the effective coil length perpendicular the magnetic field, and i [A] is the drive current. In Equations (12a) and (12b), $u_m$ [V] is the measured voltage and $v_m$ [m/s] is the measured velocity. The constant $\kappa$ [V s/A] is the mutual inductance coefficient that induces a voltage in the second coil 126 from an alternating current in the first coil 124. In order to get the true voltage from rotations of the wire in the magnetic field, denoted by u, the mutual inductance $\kappa di/dt$ needs to be subtracted from measured voltage $u_m$. The factor of 2 in both equations is a result the wire is wound on both sides of the motor 122.

In principle, in order to calculate the applied torque $\tau$, one needs to have measurements of B, L, and $r_c$, which are difficult to measure accurately. However, in Kibble's method, only the product $2r_cBL$ is measured and is calculated from Equations (12a) and (12b). The measurement of the voltage is corrupted by the induced voltage term $\kappa di/dt$. However, this term is 90 degrees out of phase with the desired voltage u. The true voltage u can be calculated by measuring the transfer function $U_i/I$ in the absence of an external magnetic field B then using this transfer function to correct the measured voltage. Alternatively, a lock-in amplifier can be used to extract only the portion of the measured voltage proportional to the velocity by using i or $\dot{\theta}$ as the reference signal. The first method is desirable when driving the first coil 124 with white pseudo-random noise from the amplifier 128, while the lock-in amplifier will work better for slowly swept sine-wave profiles. To determine the product $2r_cBL$, the mutual inductance is subtracted off the measured voltage leading to:

$$u = u_m - \kappa\frac{di}{dt} = 2r_cBL\dot{\theta} \tag{13}$$

The torque is then calculated using:

$$\tau = \frac{ui}{\dot{\theta}} \tag{14}$$

The transfer function between the torque and the angular displacement is then:

$$\frac{\theta}{\tau} = \frac{\theta\dot{\theta}}{ui} \tag{15}$$

Often times, data is collected using power spectral density (PSD) quantities for signal-to-noise reasons. When driving the system with pseudo-random noise and using PSDs to collect data, the analog to Equation (15) is:

$$\frac{\theta}{\tau} = i\omega\frac{G_{\theta,\theta}}{G_{u,i}} \tag{16}$$

where $\omega$ is the frequency in the bin of interest. The data in Equation (15) (or similarly Equation (16)) may be fit to Equation (9) in order to identify the complex moduli parameters $G_r$ and $G_i$.

EXAMPLES

As seen in FIGS. 5-13, an exemplary apparatus was constructed and experimental work related to embodiments described above were conducted.

Current Measurement

The current was measured using a shunt resistor of nominally 5 Ohm. The shunt resistor was constructed using four nominally 5 Ohm resistors (Vishay Foil Resistor Y14675R00000B9L) in a full bridge circuit with heat sinks. The entire resistance of the bridge can be accurately measured using a 4-wire measurement with a precision digital multimeter, such as the Kiethly DMM 6500 (6.5-digit multimeter) or equivalent to several better than $10^5$ accuracy. The impedance of the shunt resistor, coil, and additional wires is approximately 8 Ohm which was designed to impedance match an audio amplifier.

Angular Velocity Measurement

The angular displacement was measured optically by reflecting a laser beam off of a mirror secured to the center of the end motor and measuring its response on a photodetector. The laser was a collimated 635 nm, 1.2 mW round beam laser (Thorlabs CPS635R), and the photodetector was a two-dimensional tetra-lateral position sensing detector (Thorlabs PDP90A). The laser was focused onto the photodetector using a 100 mm focal length plano-convex mirror. The photodiode was calibrated in place by placing a mirror near the location of the motor and fixing the mirror at known angles and measuring the response of the photodiode. This calibration can be done in terms of V/deg (volts per degree) or in terms of displacement on the photodetector, which has units of V/m (volts per meter). If the latter method is chosen the angle is calculated using geometry such as $\theta=\operatorname{atan}\delta/l$. Here, $\delta$ is the measured displacement from the photodetector and l is the distance between the motor and the photodetector. Second order effects from geometry are negligible. The resolution of this setup was less than 1 μm. If the distance between the mirror and the photodetector is 10 cm, the angular resolution is $10^{-5}$ degree. In practice, measurement noise of the instrumentation measuring the photodetector was the dominating source of uncertainty and the resolution is around $10^{-4}$ degree. If needed, this uncertainty could be reduced further by sampling the photodetector using a precision digital multimeter, such as the Kiethly DMM 6500 (6.5-digit multimeter) or equivalent.

It is contemplated that other instrumentation can be used to measure the angle, such as an autocollimator.

Voltage Measurement

The voltage can be measured using any standard digitizer. The experiment demonstrated here used a NI-9239 which has an uncertainty of around $10^{-3}$. If lower uncertainties are desired, a precision digital multimeter can be used to sample the voltage from the coil.

Representative Data of System Characterization

Figure 6:
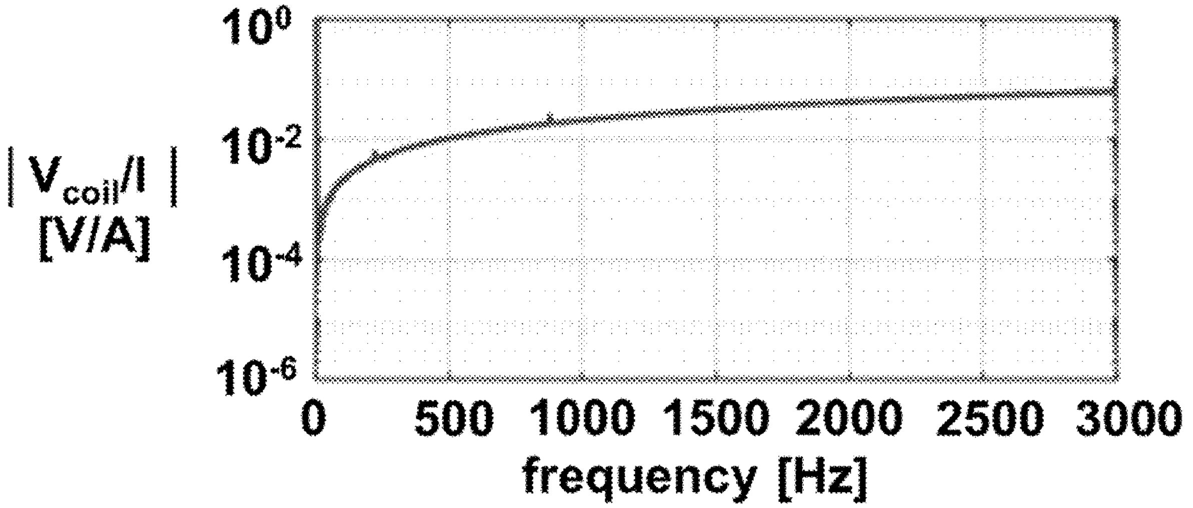
FIG. 6 shows amplitude of mutual inductance for a given motor-coil assembly.
Figure 7:
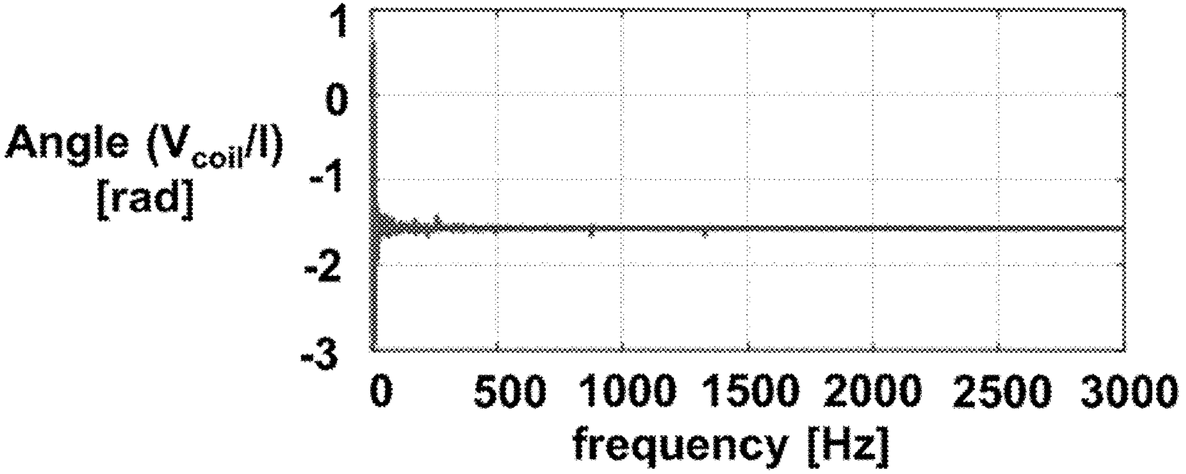
FIG. 7 shows phase of mutual inductance for a given motor-coil assembly.

Representative data of the mutual inductance correction is provided in FIGS. 6 and 7. The amplitude of the mutual inductance is shown in FIG. 6 while the phase is shown in FIG. 7. The mutual inductance correction increases with frequency and will eventually limit the bandwidth of the measurement. The exact bandwidth of measurement is dependent upon the length of the bifilar coil as well as the sample being tested. As noted earlier, the phase of the mutual inductance correction is 90 degrees out of phase with the $2r_cBL$ product.

Figure 8:
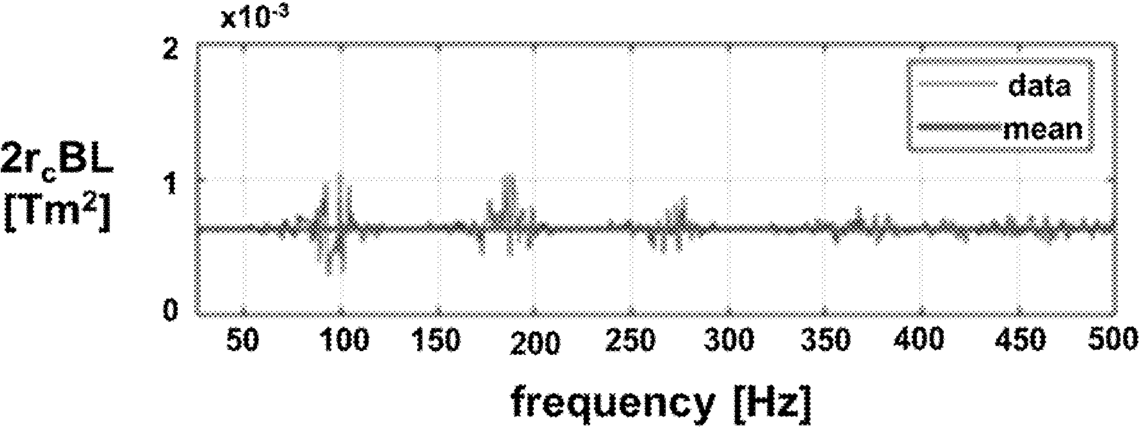
FIG. 8 shows an amplitude measurement of a $2r_cBL$ product.
Figure 9:
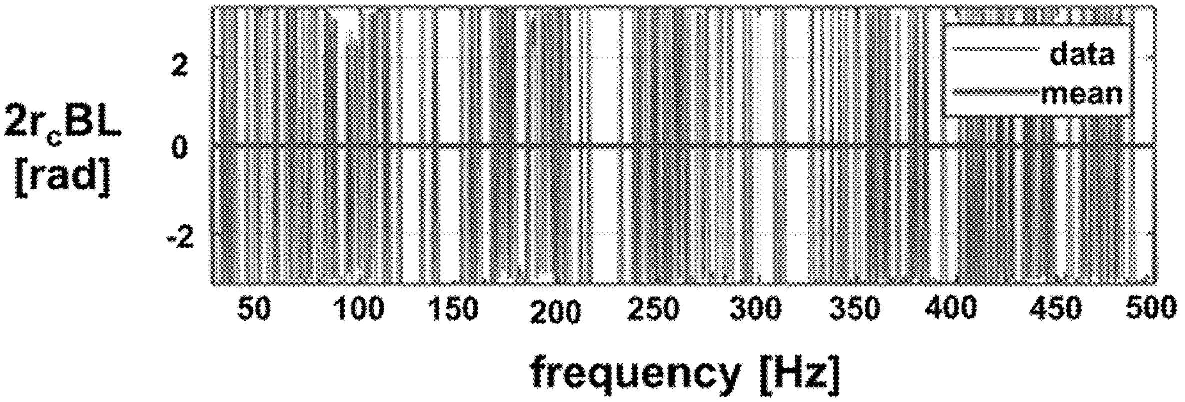
FIG. 9 shows a phase measurement of a $2r_cBL$ product.
Figure 10:
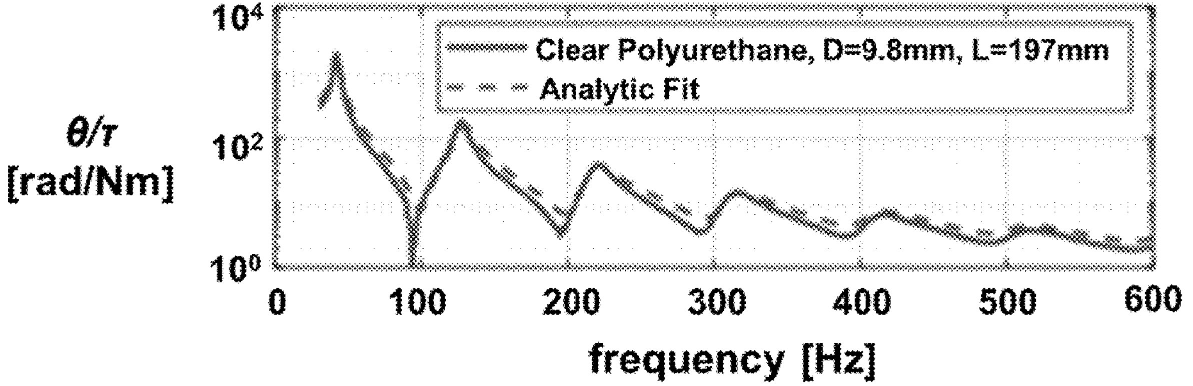
FIG. 10 shows amplitude results for a 9.8 mm diameter polyurethane specimen.
Figure 11:
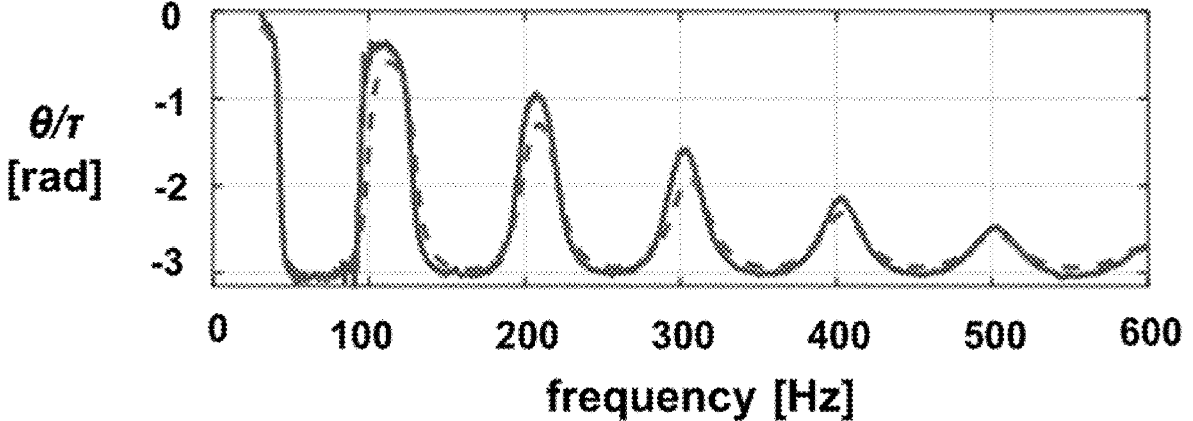
FIG. 11 shows phase results for a 9.8 mm diameter polyurethane specimen.
Figure 12:
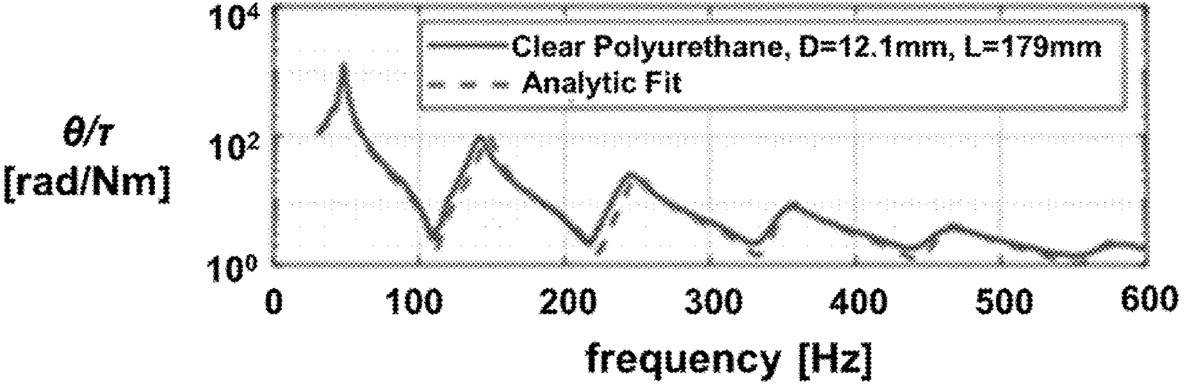
FIG. 12 shows amplitude results for a 12.1 mm diameter polyurethane specimen.
Figure 13:
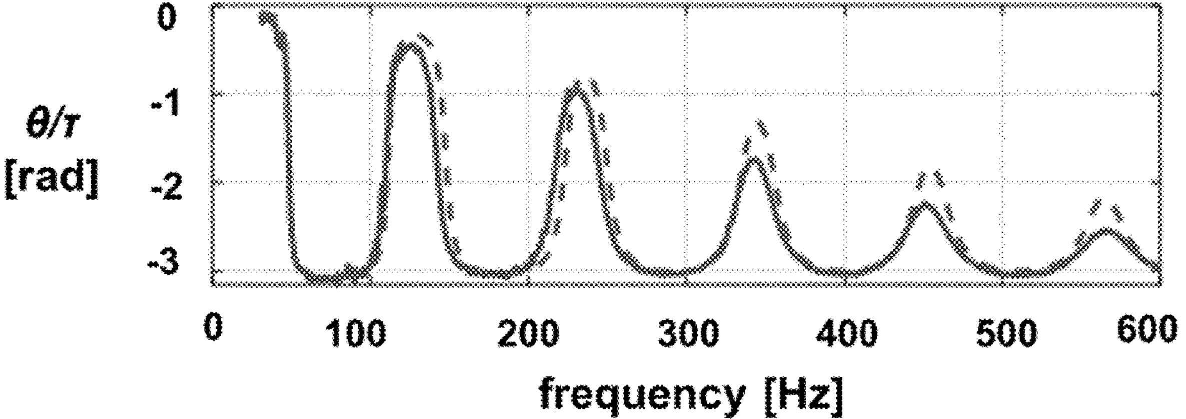
FIG. 13 shows phase results for a 12.1 mm diameter polyurethane specimen.

Representative data of the $2r_cBL$ product is shown in FIGS. 8 and 9, wherein the amplitude is shown in FIG. 8 and the phase is shown in FIG. 9. The $2r_cBL$ product is fairly flat across the frequency range but shows some variations where the signal to noise is low for a given sample. From first principles, the $2r_cBL$ product should be a constant so that the mean over a frequency range can be used. Moreover, the phase of $2r_cBL$ product is zero which is consistent with a constant amplitude. The $2r_cBL$ product for this motor was determined to be $6.37\times10^{-4}$ $Tm^2$ (Tesla-meter$^2$).

Measurement of the Dynamic Shear Moduli

Two viscoelastic specimens of the same material but different dimensions were tested to validate this technique. The dimensions of the two clear polyurethane materials were dimensions of 9.8 mm diameter and 197 mm in length for sample 1, and 12.1 mm diameter and 179 mm in length for sample 2. Results are shown in FIGS. 10-11 and 12-13, respectively.

The transfer functions were measured using the technique outlined in the present disclosure, and the data was fit to Equation (9). Pseudo-random white noise was used to drive the system. Here, it was assumed that the complex shear modulus had both a constant real and imaginary part. Better fits could likely be achieved by assuming that the shear modulus is frequency dependent, such as with Equation (10). For sample 1, the two shear moduli were: $G_r$=1.66 MPa and $G_i$=0.14 MPa. For sample 2, the two shear moduli were $G_r$=1.73 MPa and $G_i$=0.08 MPa.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible considering the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. Therefore, while certain exemplary embodiments of the apparatus and methods of using and making the same disclosed herein have been discussed and illustrated, it is to be distinctly understood that the invention is not limited thereto but may be otherwise variously embodied and practiced within the scope of the following claims.

What is claimed is:

1. A method of measuring dynamic torque to determine frequency-dependent shear, the method comprising:

providing an apparatus, the apparatus comprising:
- at least one magnet,
- a viscoelastic specimen comprising a first end and a second end, wherein the first end is fixed to a structure,
- a motor secured to the second end of the specimen,
- a first coil and a second coil fixed to the motor,
- a mirror secured to the motor,
- a laser source, and
- a photodetector, wherein the mirror is positioned at a distance from the photodetector;

providing a magnetic field via the magnet;

positioning the motor proximate to the at least one magnet such that the motor is in the magnetic field;

providing a current in the first coil via an amplifier, such that the first coil interacts with the magnetic field and the current to apply a force to the specimen;

focusing the laser source on the mirror;

providing a laser via the laser source, such that the mirror reflects the laser;

detecting the laser reflect from the mirror via the photodetector, wherein a position of the laser detected by the photodetector changes as force is applied to the specimen; and calculating angular position using the formula $$\theta = \mathrm{asin}\left(\frac{\delta}{L_0}\right),$$

where θ is the angular position of the viscoelastic specimen, δ is the change in position of the laser detected by the photodetector and $L_0$ is the distance between the mirror and the photodetector.

2. The method of claim 1, further comprising calculating the angular velocity using the formula $$\dot{\theta} = \frac{d\theta}{dt}$$

or the formula $\dot{\theta}=i\omega\theta$.

3. The method of claim 1, wherein the viscoelastic specimen comprises a viscoelastic material selected from the group consisting of polymers, urethanes, rubbers, and mixtures thereof.

4. The method of claim 1, wherein the viscoelastic specimen is rod-shaped.

5. The method of claim 1, wherein the aspect ratio of the specimen is at least 10.

6. The method of claim 1, further comprising placing the specimen in a temperature control chamber.

7. The method of claim 1, further comprising placing the apparatus in a temperature control chamber.

8. The method of claim 1, further comprising measuring a current in the first coil using a resistor.

* * * * *